(12) United States Patent
Gram

(10) Patent No.: US 7,497,676 B2
(45) Date of Patent: Mar. 3, 2009

(54) PROCEDURE AND MACHINERY FOR THE MOLDING OF AN ASSEMBLED OBJECT

(76) Inventor: Jes Tougaard Gram, 10625 Pinnacle Peak Rd., Scottsdale, AZ (US) 85255

( * ) Notice: Subject to any disclaimer, the term of this patent is extended or adjusted under 35 U.S.C. 154(b) by 262 days.

(21) Appl. No.: 10/631,877

(22) Filed: Jul. 31, 2003

(65) Prior Publication Data
US 2004/0124558 A1   Jul. 1, 2004

(51) Int. Cl.
*B29C 45/16* (2006.01)
(52) U.S. Cl. .................. 425/123; 425/234; 425/439; 425/576; 425/588
(58) Field of Classification Search ............ 425/112, 425/116–117, 395, 588, 444, 439, 123, 193–195, 425/233–234, 517, 574, 576, 581
See application file for complete search history.

(56) References Cited

U.S. PATENT DOCUMENTS

| | | | |
|---|---|---|---|
| 3,224,043 A | | 12/1965 | Lameris et al. |
| 3,319,300 A | | 5/1967 | Hehl |
| 4,726,558 A | | 2/1988 | Ozone et al. |
| 4,744,741 A | * | 5/1988 | Glover et al. ............. 425/123 |
| 5,030,406 A | * | 7/1991 | Sorensen ................ 264/255 |
| 5,196,213 A | * | 3/1993 | Watanabe et al. .......... 425/556 |
| 5,338,592 A | | 8/1994 | Ohsumi et al. |
| 6,503,075 B1 | * | 1/2003 | Schad et al. ............. 425/576 |
| 6,783,346 B2 | * | 8/2004 | Bodmer et al. ............ 425/112 |

FOREIGN PATENT DOCUMENTS

| | | |
|---|---|---|
| DE | 4032500 | 4/1992 |
| DE | 4318574 | 12/1994 |
| JP | 61063426 | 4/1986 |
| JP | 61161004 | 7/1986 |
| JP | 2143819 | 6/1990 |

OTHER PUBLICATIONS

English abstracts for JP 2-143819.*

* cited by examiner

*Primary Examiner*—Yogendra Gupta
*Assistant Examiner*—Thu Khanh T Nguyen

(57) ABSTRACT

A procedure for sequential molding of an assembled object and a machine for the performance of the procedure are provided. A mold has a stationary front part, a movable back part and at least one turnable middle part. After the molding of the first part of an object, the middle part is turned at least once around an axis orthogonal to the moving direction between the front part and the back part, before the molding of the following part of the object takes place. Injection and cooling can take place in the front part and in the back at the same time. In an alternative embodiment, the middle part can be fitted with insulation to maintain a higher temperature between different regions of the mold assembly, making it possible to mold together considerably different materials such as a thermo plastic material and an elastomer, a silicone, or metal and plastic.

13 Claims, 3 Drawing Sheets

PROCEDURE AND MACHINERY FOR THE MOLDING OF AN ASSEMBLED OBJECT

Figure 1:
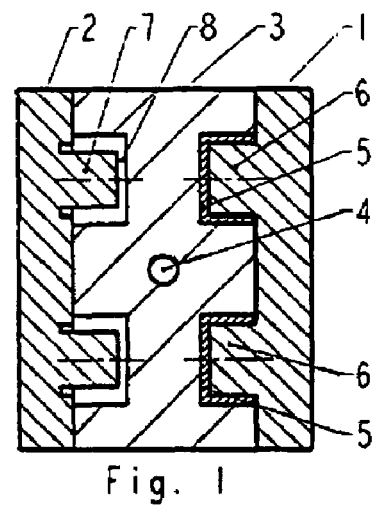

The invention concerns a procedure for the production of one in at least two subsequent castings molded object in a mold consisting of at least three mold parts, and a machine for the performance of this procedure.

It is a known technique to mold an object in two or more subsequent castings, e.g., an injection molded object in plastic in two different colors cast subsequently. This can be realized by first molding the material of one color in one part of the, for this purpose, arranged mold, e.g., a letter in a key in a keyboard. After the cooling of the material and removal of the core parts of the mold, the material of the other color is molded around the molded letter, which now itself serves as a part of the mold, in the same mold, for the final key. This procedure requires an injection molding machine with two injection units.

There are also known injection molds which consists of more than two mold parts, a front part and a back part, e.g., the so-called sandwich molds which also consist of a movable middle part placed between the two other mold parts. The purpose of such a mold is not to cast objects in two or more subsequent castings, but to cast more objects at the same time in the same mold by using the, in this way, doubled closing area of the mold.

Among injection molds containing more than one front part and one back part are further known the so-called three plate tools. Between the front part and the back part is placed a third plate as a mold part. Due to the fact that the inlet channels in the mold are placed between the two foremost mold parts and the objects between the two hindmost you achieve, that the inlet and the objects are being torn off and ejected separately when the mold is opened. The advantage hereby is that the inlet and the finished objects thus can be kept separated more easily.

There are also known molds which in their front part or their back part has an insertion which can be turned while the mold is open. In the hitherto known cases this insertion exclusively is turned around an axis which is parallel to the mutual direction of movement between the front part and the back part, thus you can achieve the same effect as by a turning table. The purpose of this turning movement is to achieve some extra steps during the molding cycle, so that there, e.g., can be injected material in the mold and simultaneously cooling the mold and thereby saving cycle time.

The purpose of this procedure and machinery according to the invention is that by the casting of multi-component objects a highly increased number of objects per time unit in a defined mold are achieved. Also, you can use a considerably smaller molding machine than possible until now and still achieve the same number of objects per time unit.

The procedure according to the invention is characterized by the fact that at least one middle part placed between the molds preferably stationary front part and the movable back part after molding of the first part of the object are turned at least one time preferably 180 degrees around an axis/axle which preferably is in a right angle to the movement direction between the front part of the mold and the back part, before the molding of the following part of the object.

Due to the fact that the middle part after the molding of the first part of the object are turned 180 degrees around an axis which is not parallel to, but in a right angle to the movement direction between the front part and the back part, a number of interesting possibilities are achieved, that has not yet been possible to achieve by the hitherto known designs of molds.

As explanation of the principle in the procedure a simple example can be chosen where each cycle molds a single object comprising two parts where the front and the back of the middle part are identical. The molding of the first part of the object are made in the cavity formed between the front part and the middle part. After a suitable cooling of the object, the mold is opened so that the middle part can be turned 180 degrees preferably around a vertical axis. Doing this you must secure that the first molded part of the object remains positioned on the part of the middle part facing the front part during the molding.

After turning the middle part 180 degrees the mold is closed again, now with the first molded part facing the back part and forming an integrated part of the mold for the hereby achieved new cavity. Between the middle part and the back part you hereby can perform the following molding of material from another molding unit on the partly molded object. Suitable simultaneously with this final molding on the first object there can in the now remade cavity between the front part and the middle part be performed the first molding on the next object form the first molding unit.

After a suitable cooling and hardening of the objects in both the molding parts, suitably using. the same part of the cycle time, the mold is opened and the first complete molded object is ejected from the back part. At the same time the middle part is turned, with the partly molded next object placed on its other identically surface, again 180 degrees preferably back to, but possibly forwards to, its original position. Hereafter the mold is closed again and there are injected the respective materials from the two injection units, suitable simultaneously in the two mold cavities between respectively the front part and the middle part, where the first part of the following object is molded, and between the middle part and the back part where the second and finished object is molded. Afterwards the described cycle can be repeated in a current production of finished assembled objects.

The above described cycle concerns a single assembled object ejected from the mold each time; but in principle the same will be the case for a larger quantity of cavities per mold part. In the example above it is only necessary with a single turnable middle part because the assembled object only consists of two parts.

If the assembled object consists of more parts, the procedure also in principle is the same. Should more stations be needed due to this, an extra turnable middle part or more can be added.

It can possibly be of advantage that the turning movement of the middle part is performed outside the space between the front part and the back part. This can be realized through some kind of cassette system where the middle plate in a running cycle can be replaced with a corresponding middle plate and turned between the single moldings outside the actual molding area between the front part and the back part.

The procedure according to the invention can in this way result in a considerable time and cost reduction by the molding of assembled objects in relation to the hitherto known procedures of molding in sequence two or more assembled objects.

If the objects to be molded not as foreseen in the above described example are suitably symmetrical, you can achieve the same effect due to the front and the back of the turnable middle part of the mold are each other's reflection. The two surfaces of the middle part can also possibly correspond in another way.

By the designing of the molding equipment it as mentioned must be considered, that the object or set of objects at the opening of the mold after the first molding are released from the stationary mold part and remains positioned in/on the turnable middle part and thereby being removed to the space between the middle part and the other mold part. This removal can simplest be achieved by a better hold-down in the middle part than in the front part and respectively a better hold-down in the back part than in the middle part.

The necessary removal of the object from the front part, where the first part of the material is injected, via the middle part to the back part where the final portion of the material is injected, as well as where the ejection of the finished assembled object takes place, can also be achieved in another way. This, e.g., can be realized by an ejector, core pull or jaw system placed in the turnable middle part. The ejector system, e.g., can be of a new design especially developed for the middle part where the ejectors has a direct connection between the opposing cavities in the middle part. Hereby the ejectors, e.g., through a ball screw system placed in the middle of the ejector in the middle plate can move the ejectors forth and backwards in the part of the middle plate facing the back part. While the ejectors have a direct connection between the opposing cavities or cores in the middle plate it hereby becomes possible to eject the objects, there are positioned on a core or in another way are placed on the middle part, without using any considerable space in the mold for this purpose.

In a special design of the machinery for the performance of the procedure according to the invention, at least one of the turnable middle parts is thermally insulated, e.g., with an insulating plate between the front and the back of the middle part. It can hereby be achieved, that, e.g., in the cavities between the front part and the middle part, a considerably higher temperature can be sustained, than in the cavities between the middle part and the back part. This in principle can also be realized by the traditional index mold/turn mold where, e.g., the one part of the movable plate is insulated opposed to the other part.

For the best possible utilization of the insulated middle part the following minor changes of the above-mentioned procedure can be recommended: When the partly molded object or objects are removed from the hot area between the front part and the middle part to the cooler area between the movable middle part and the back part, the middle part is turned immediately after the object/objects hereby has been transferred to be positioned in the back part, and 180 degrees backwards again. Hereby the hottest part of the middle plate will always be pushed against the hot front part, whereby it, e.g., becomes easier to sustain a considerably higher temperature in the area at the front part than in the area at the back part.

The advantage in sustaining a constant and high difference in temperature in the mentioned areas is that you thereby achieve the possibility to mold two different materials together, which normally is not possible by the use of a traditional mold. It can, e.g., be a thermoplastic material and an elastomer, a thermoplastic material and a silicone plastic, a silicone and a metal and so forth.

This method to sustain a considerable difference in temperature between two areas in the mold on the contrary will hardly be necessary when using the procedure according to the invention to mold a thermoplastic material together with a metal or two different metals together. This is because both metals and thermoplastic materials are ejected in cooled conditions.

Using the procedure according to the invention you, e.g., can mold a metal as aluminum in the front part and a polyolefine in the back part. Hereby there also can be obtained the advantage that when the plastic is molded around the metal, the plastic material can cover the rough edges that appear by the molding of metals. These rough edges that normally appear when molding metal, therefore need not be removed, but on the contrary they can contribute with a better connection of the plastic to the metal. This give possibilities to develop a machine according to the invention that is capable of molding plastic and metal together. But such a combined plastic and metal molding machine can also be utilized in connection with existing mold constructions.

The more precise advantages and designs of the invention will appear from the drawing and the connected description.

Figure 2:
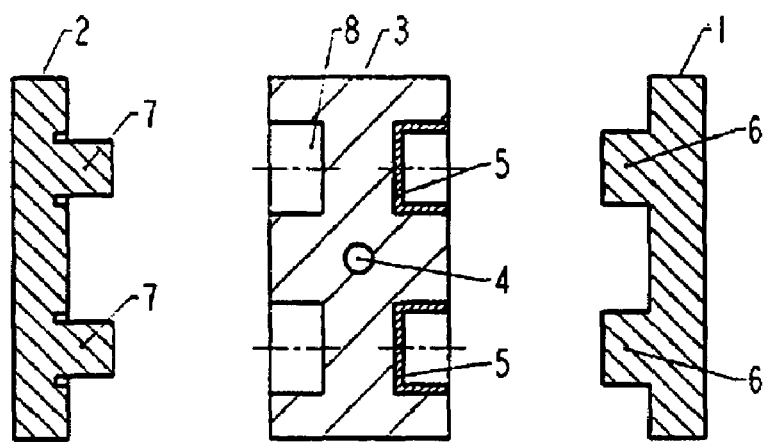
Figure 3:
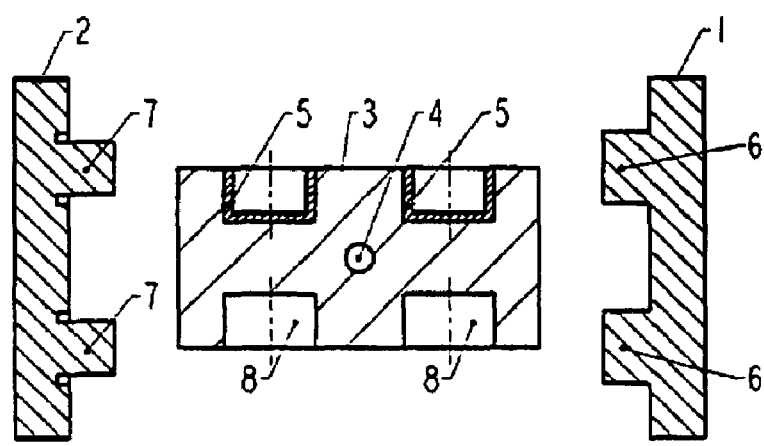
Figure 4:
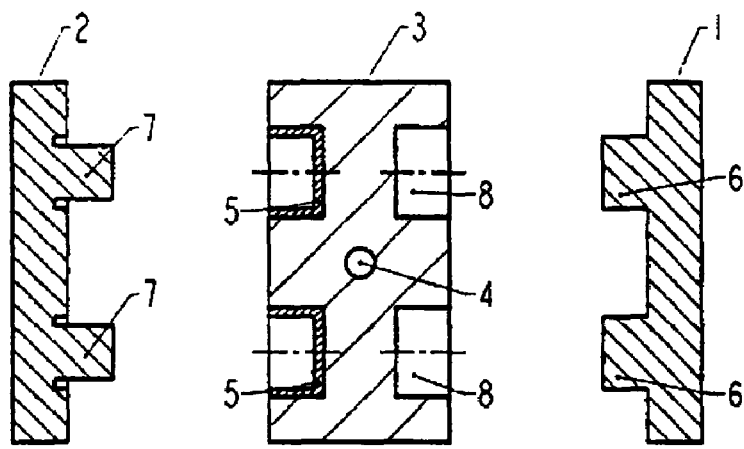
Figure 5:
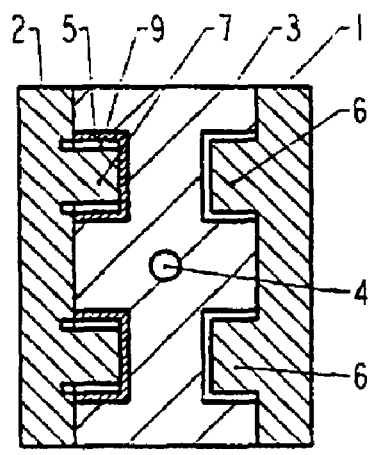
Figure 6:
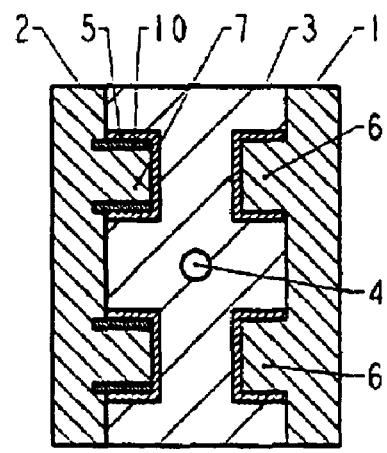
Figure 7:
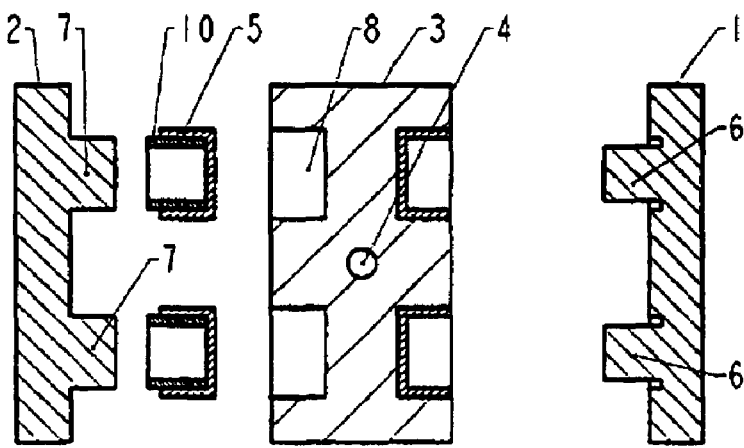
Figure 8:
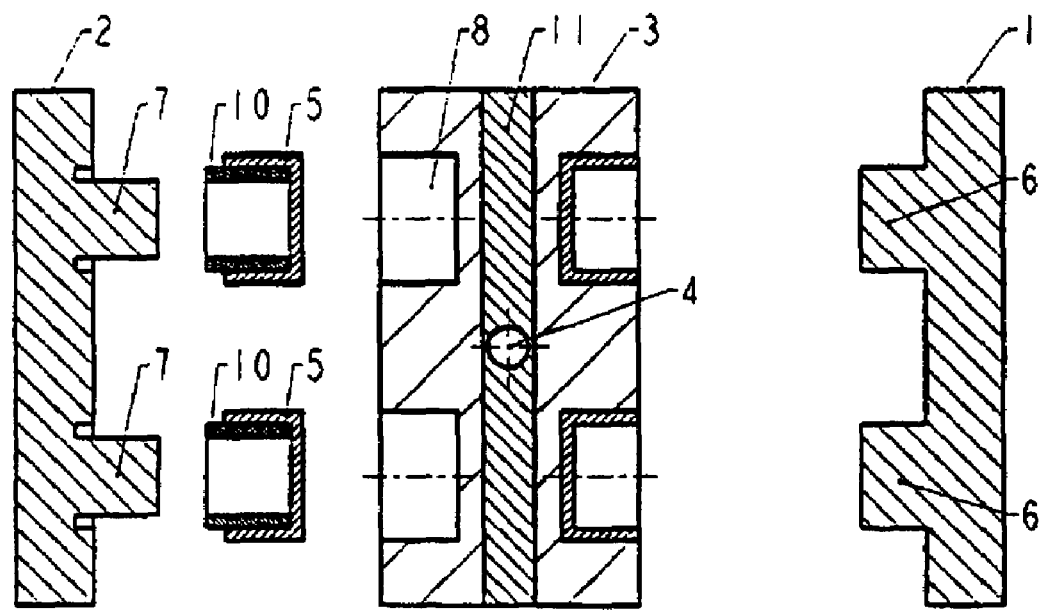
Figure 9:
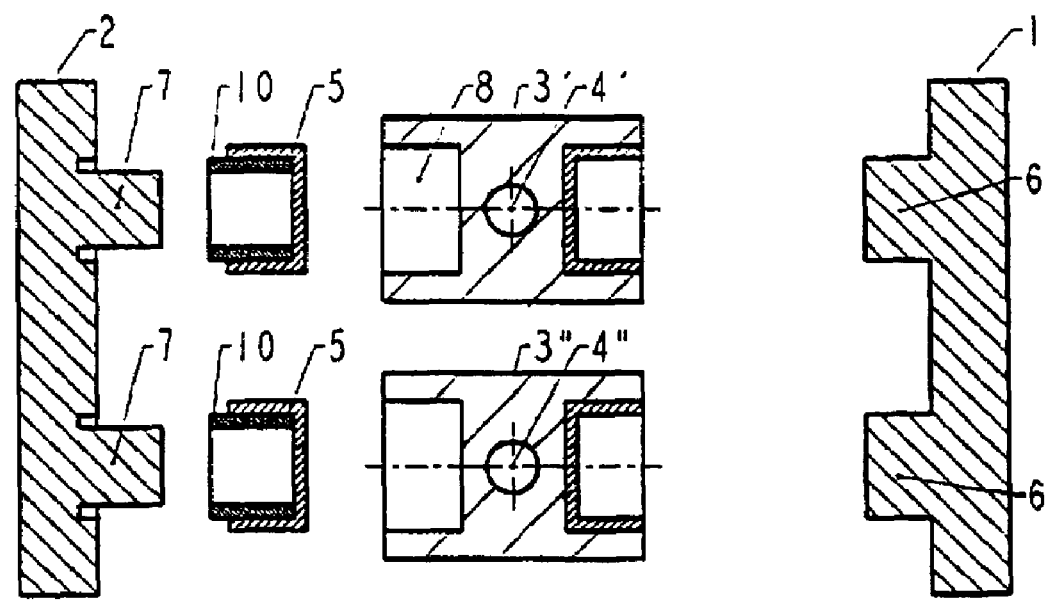

FIG. 1 shows a design with a closed mold and the first part of the object molded FIG. 2 shows the same during opening FIG. 3 shows the same in fully opened condition with the middle part turned 90 degrees FIG. 4 shows the same during closing FIG. 5 shows the same fully closed FIG. 6 shows the same after the molding in both sides of the middle part FIG. 7 shows the same after opening and ejection of the first finished object FIG. 8 shows a design with an insulation in the middle part FIG. 9 shows a design with the middle part operating in sections.

In FIG. 1 is shown from above a section of an example of a closed mold to perform the procedure according to the invention. The mold consists of a stationary front part 1 and a movable back part 2, as well as a movable middle part 3, that further can be turned around an, in this case, vertical places axis/axle 4. In the shown example is just molded as the first part 5 of the object a screw cap intended to be molded separably together with a matching threaded tube neck for serving as a closure on a glass for pills. On the front part 1 is also a (not shown) injection unit. On the front part is shown the threaded cores 6 and on the back part 2 are shown the cores 7, which are smaller than the threaded cores 6, to allow the following molding of the threaded tube neck, which here is the last molded part of the assembled object. In the middle part 3 is shown in FIG. 1 both ends can be identically designed cavities/mold cavities 8.

FIG. 2 shows the same mold during opening, where the back part 2 is moved left away from the middle part 3, which carries the first molded parts of the object 5 positioned in the cavities 8.

In FIG. 3 is shown the same mold fully opened, where the middle part 3 now is performing its turning and is turned 90 degrees which means half-way around its axis/axle 4.

On FIG. 4 is seen the same mold in the process of closing, and where the middle part 3 has fulfilled its turning of 180 degrees, so that the first molded parts 5 of the object now face the back part.

FIG. 5 shows the mold in closed condition where the first molded parts 5 of the object, here the cooled screw cap, are ready to perform as a part of the mold, as they in connection with the cores 7 in the back part 2, which has a smaller diameter than the cores 6 in the front part 1, forms cavities 9.

In FIG. 6 are shown the same mold also in closed condition where the second part of the assembled object 10, the threaded tube neck, now are molded in mold cavities 9 in the back part 2. Simultaneously, the first parts of the next set of assembled objects are being molded in the front part 1. The injection in the two surfaces of the middle part 3, as well as the cooling, has occurred at the same time, saving a considerable amount of cycle time.

In FIG. 7 are seen the finishing of the first cycle, where the mold is opened and cooled, assembled object (5, 10) are now shown being ejected from the back part 2 by means of ejectors not shown on the figure. As the last molded parts of the object 10, here the threaded tube necks, is molded innermost, they may be prone to shrink a little bit compared to the screw caps, whereby the two parts afterwards may be easily separated and reassembled manually. In the right part of the middle part 3 the first parts of the next portion of objects are passing from the front part 1, after a turning of 180 degrees, to be placed in the back part 2, so that the following cycle is continued and the process can proceed.

In FIG. 8 is shown a special design of the turnable middle part 3 supplied in the middle with an insulating plate 11 or similar, which can cause, that in the area of the mold at the front part 1 a higher temperature can be maintained, than in the area at the back part 2. This is achieved especially when the turnable middle part 3, having delivered a set of the first molded part of the object to the back part 2, immediate are turned back again.

FIG. 9 shows a special design of the turnable middle part 3 where it for practical reasons is separated in two or more slim, preferably identically and vertically placed sections. Here is only shown two sections (3', 3") each able to turn around a vertical axis/axle (4', 4"). The lesser maximum turning radius of each of the slim sections causes that the necessary distance between the front part 1 and the back part 2 at the opening will be considerably reduced. A considerably larger distance between the front part and the back part would be necessary if a single middle part 3, with the same number of cavities and width equal to the sum of the width of the single sections, should be able to turn 180 degrees in the space between the front part 1 and the back part 2.

The designs of the machine according to the invention shown on the drawing are only a part of the possible examples. Yet they should be able to show the fundamental principles of the invention.

Besides the shown there also could have been displayed the special ejectors in the middle part 3, that connects the connecting cavities or cores on the two opposite surfaces of the middle part. Using a ball screw or another mechanism in the middle of the ejectors, they can be moved forth and backwards, and thus utilized for ejecting the assembled objects if the objects after the last molding are to be ejected from the middle part 3.

The invention claimed is:

1. A mold comprising:
   a front part having a front profile;
   a back part having a back profile; and
   a plurality of middle parts, each middle part having at least a first side of the middle profile;
   wherein at least one of the front and back parts moves relative to one another between an open position and a closed position,
   wherein the plurality of middle parts is disposed between the front and back parts in the closed position,
   wherein each middle part is turnable about a separate axis,
   wherein the front part and the first sides of the middle parts are alignable together to form a plurality of first perimeters defining a corresponding plurality of first cavities substantially bounded by the front profile and the first sides of the middle profiles when the front part and the first sides of the middle parts are aligned together in the closed position whereby a plurality of sub-unit molded products can be formed in the plurality of first cavities by the filling the first cavities with a substrate in which each sub-unit molded product comprising a first shape having a front complementary profile and a first side of the middle complementary profile,
   wherein the front part and the middle parts are separable from each other after said plurality of sub-unit molded products have been formed, and
   wherein the back part and the first sides of the middle parts are alignable together when the plurality of sub-unit molded products are still attached to the first sides of the middle parts to form a plurality of second perimeters defining a corresponding plurality of second cavities substantially bounded by a plurality of front complementary profiles in each of the sub-unit molded products when still attached to the first sides of the middle parts and bounded by the back profile when the first sides of the middle parts and the back part are aligned together in the closed position whereby, a plurality of assembled objects can be formed by filling the second cavities with a substance that mates with the previously formed sub-unit molded products, in which each assembled object comprising a second shape having the front complementary profile and a back complementary profile.

2. The mold according to claim 1 wherein each middle part rotates approximately 180 degrees between molding cycles.

3. The mold according to claim 1 wherein the rotation axis of each middle part is perpendicular to the relative movement direction between the front and back parts.

4. The mold according to claim 1 wherein each middle part having several back profiles.

5. The mold according to claim 1 wherein each middle part having an insulating plate wherein each middle part is thermally insulated.

6. The mold according to claim 1 wherein the front part has several front profiles.

7. The mold according to claim 1 wherein the back part has several back profiles.

8. The mold according to claim 1 further comprising an ejector in each middle part.

9. The mold according to claim 8 wherein the ejector includes a ball screw mechanism.

10. The mold according to claim 1 further comprising at least one hold-down to retain each sub-unit molded product to each middle part during a molding cycle.

11. The mold according to claim 1 wherein the substrate is selected from the group consisting of a thermoplastic material, an elastomer, a silicon plastic, and a metal.

12. The mold according to claim 1 wherein the substance is selected from the group consisting of a thermoplastic material, an elastomer, a silicon plastic, and a metal.

13. The mold according to claim 1 wherein the substrate comprises a metal and the substance comprises a plastic material.

* * * * *